United States Patent
Hormis et al.

(10) Patent No.: US 7,965,770 B2
(45) Date of Patent: Jun. 21, 2011

(54) SHARED LOGIC FOR DECODING AND DEINTERLACING OF COMPRESSED VIDEO

(75) Inventors: Raju Hormis, New York, NY (US); Dmitrii Loukianov, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1507 days.

(21) Appl. No.: 10/815,172

(22) Filed: Mar. 31, 2004

(65) Prior Publication Data
US 2005/0226328 A1    Oct. 13, 2005

(51) Int. Cl.
    H04N 7/12    (2006.01)
(52) U.S. Cl. .............................. 375/240.12; 375/240.03
(58) Field of Classification Search .............. 375/240.12
    See application file for complete search history.

(56) References Cited

U.S. PATENT DOCUMENTS

| | | | | |
|---|---|---|---|---|
| 6,269,484 B1 * | 7/2001 | Simsic et al. | ................. | 725/151 |
| 6,968,007 B2 * | 11/2005 | Barrau | .................... | 375/240.14 |
| 7,203,234 B1 * | 4/2007 | Zeng | ......................... | 375/240.03 |
| 2001/0002205 A1 * | 5/2001 | Beattie | ..................... | 375/240.12 |
| 2005/0175099 A1 * | 8/2005 | Sarkijarvi et al. | ........ | 375/240.16 |

OTHER PUBLICATIONS

Johnson et al. (Johnson), Frequency Scalable Video Coding Using MDCT, IEEE, pp. V-477-V480, 1994.*

* cited by examiner

*Primary Examiner* — Anner Holder
(74) *Attorney, Agent, or Firm* — Schwegman, Lundberg & Woessner, P.A.

(57) ABSTRACT

One embodiment includes a method that includes receiving a compressed video stream. The method also includes decoding a number of blocks of the compressed video stream to output a number of blocks of decoded video data. The decoding is based on at least one motion compensation vector. The method also includes deinterlacing the number of blocks of the decoded video data to output deinterlaced video data. The deinterlacing of one of the blocks of the number of blocks is based on the at least one motion compensation vector if a prediction error energy for the at least one motion compensation vector for the block is less than a threshold.

18 Claims, 4 Drawing Sheets

SHARED LOGIC FOR DECODING AND DEINTERLACING OF COMPRESSED VIDEO

TECHNICAL FIELD

The application relates generally to data processing, and, more particularly, to decoding and deinterlacing of compressed video.

BACKGROUND

The processing of video for display is becoming computationally more expensive. Moreover, the number of components typically needed for the processing of such video is increasing. Digital video is often compressed in four-by-four or eight-by-eight blocks of pixels using motion-compensated (MC) prediction combined with a transform, such as a Discrete Cosine Transform (DCT). The video encoder typically encodes the prediction coefficients (such as motion compensation vectors, frame field motion compensated decisions, direction, etc.) as well as the transform coefficients into the compressed video bitstream. The decoder then uses these parameters to decode and reconstruct the video. Additionally, if the video signal is in an interlaced format and is to be displayed on a video display having a progressive format, a deinterlacer may then deinterlace the reconstructed video.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings.

DETAILED DESCRIPTION

Methods, apparatus and systems for shared logic and operations for decoding and deinterlacing of compressed video are described. In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
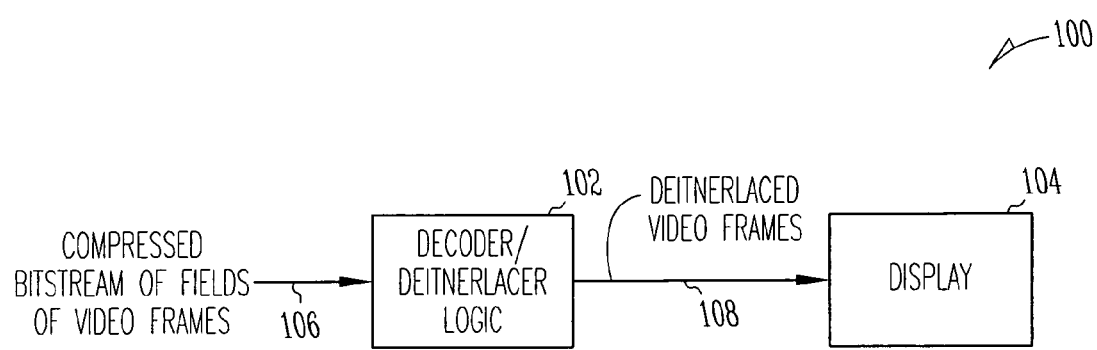
FIG. 1 illustrates a simplified block diagram of a system for shared decoding and deinterlacing of compressed video, according to one embodiment of the invention.

FIG. 1 illustrates a simplified block diagram of a system for shared decoding and deinterlacing of compressed video, according to one embodiment of the invention. In particular, FIG. 1 illustrates a system 100 that includes a decoder/deinterlacer 102 that is coupled to receive a compressed bitstream of fields of video frames 106. As further described below, the decoder/deinterlacer 102 includes a shared logic for performing both decode operations and deinterlace operations. The decoder/deinterlacer 102 is coupled to a display 104. The decoder/deinterlacer 102 is to output deinterlaced decoded video frames that are inputted into the display 104. The display 104 displays the deinterlaced decoded video frames. In some embodiments, the display 104 is one of many different types of progressive scan displays. For example, the display 104 may be a plasma screen, a liquid crystal display (LCD) screen, a cathode ray tube (CRT), etc. that provide a progressive scan display.

As further described below, motion compensation vectors used in the decoding of the compressed bitstream of frames of video may also be used in the deinterlacing operations of the decoded frames of video. In some embodiments, the motion compensation vectors may be evaluated to determine whether such vectors are "good" estimations prior to being used in the deinterlacing operations. Such evaluations allow the deinterlace operations to be performed at an acceptable level even if the encoder is not providing acceptable motion estimation.

Such evaluations may be based on a number of different prediction errors. For example, in an embodiment, such evaluations may be based on a prediction error energy. In one embodiment, the prediction error energy may be computed by summing the square of the transform coefficients that have been decoded as part of the decode operations. In one embodiment, such evaluations may be based on the quantization scale factor used in the de-quantization of the compressed bitstream during the decode operation. In some embodiments, such evaluations may be based on the combination of the prediction error energy and the quantization scale factor for a block. As further described below, embodiments of the invention may reduce latency and buffering during the deinterlacing operations because the motion compensation vectors do not have to be generated for the deinterlacing operations.

Figure 2:
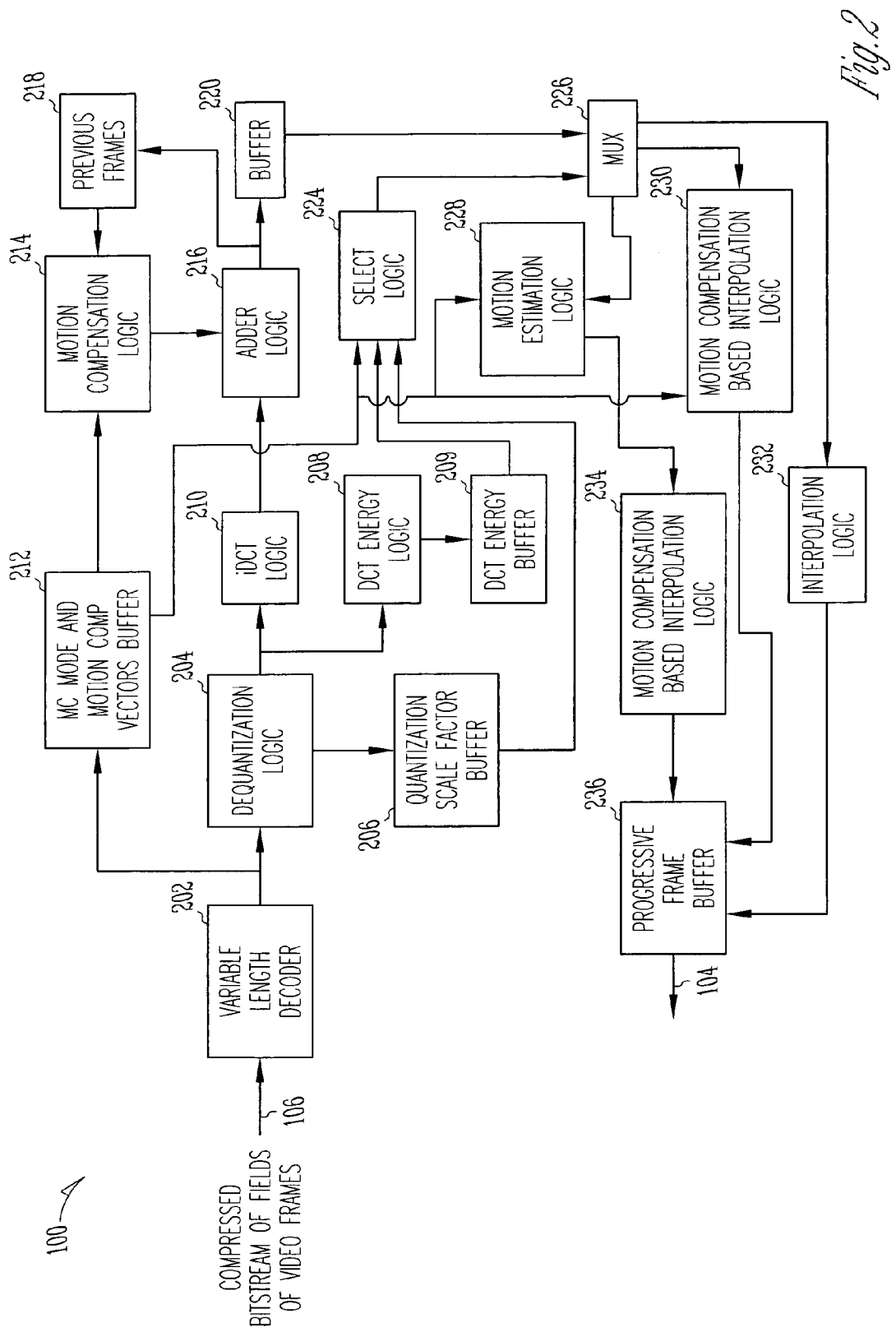
FIG. 2 illustrates a simplified block diagram of a shared decoder and deinterlacer, according to one embodiment of the invention.

FIG. 2 illustrates a simplified block diagram of a shared decoder and deinterlacer, according to one embodiment of the invention. In particular, FIG. 2 illustrates a more detailed block diagram of one embodiment of the decoder/deinterlacer 102.

The decoder/deinterlacer 102 includes a variable length decoder 202, a de-quantization logic 204, a quantization scale factor buffer 206, a prediction error energy logic 208, a prediction error energy buffer 209, an inverse transform logic 210, a motion compensation mode and motion compensation vectors buffer 212, a motion compensation logic 214, an adder logic 216, a buffer 220, a select logic 224, a multiplexer 226, a motion estimation logic 228, a motion compensation-based interpolation logic 230, an interpolation logic 232, a motion compensation-based interpolation logic 234 and a progressive frame buffer 236.

The variable length decoder 202 is coupled to receive the compressed bitstream of fields of video frames 106. For example, the compressed bitstream may be the even or odd fields of the video frames. An output of the variable length decoder 202 is coupled to an input of the de-quantization logic 204 and an input of the motion compensation mode and motion compensation vectors buffer 212. In particular, a part of the output of the variable length decoder 202 includes a motion compensation mode and motion vector for a block within the frame of the video. The variable length decoder 202 stores the motion compensation modes and motion compensation vectors for the blocks into the motion compensation mode and motion compensation vectors buffer 212. The motion compensation mode and motion compensation vectors buffer 212 is also coupled to an input of the motion compensation logic 214, coupled to one of the inputs into the select logic 224, coupled to the motion estimation logic 228 and coupled to one of the inputs into the motion compensation-based interpolation logic 230. An output of the de-quantization logic 204 is coupled to an input of the quantization scale factor buffer 206. A part of the output of the de-quantization logic 204 includes a quantization scale factor, which is stored in the quantization scale factor buffer 206. The quantization scale factor buffer 206 is coupled as one of the inputs into the select logic 224. Another part of the output of the de-quantization logic 204 includes de-quantized transform coefficients, which are inputted into the prediction error energy logic 208 and the inverse transform logic 210.

An output of the prediction error energy logic 208 is coupled to the prediction error energy buffer 209. The output of the prediction error energy logic 208 is the prediction error energy of blocks within the frames of video. The prediction error energy buffer 209 is coupled as one of the inputs into the select logic 224. An output of the inverse transform logic 210 is coupled as one of the inputs into the adder logic 216. An output of the motion compensation logic 214 is coupled as one of the inputs into the adder logic 216. A part of the output of the adder logic 216 includes previous frames 218 that are coupled to be inputted into the motion compensation logic 214. The output of the adder logic 216 is inputted into the buffer 220.

An output of the buffer 220 is coupled as a data input into the multiplexer 226. An output of the select logic 224 is coupled as a control input into the multiplexer 226. The multiplexer 226 may include three different outputs. A first output of the multiplexer 226 is coupled to an input of the motion estimation logic 228. As further described below, this output is selected if (1) the block within the frame of video being processed is non-intra coded, (2) the prediction error for the motion compensation vector for this block (from the decode operations) is small, and (3) the quantization of this block did not artificially reduce the prediction residual energy. A second output of the multiplexer 226 is coupled to an input of the motion compensation-based interpolation logic 230. This output is selected if (1) the block within the frame of video being processed is non-intra coded and (2) the prediction error for the motion compensation vector for this block (from the decode operations) is not small. A third output of the multiplexer 226 is coupled to an input of the interpolation logic 232. This output is selected if the block within the frame of video being processed is intra coded.

Figure 4:
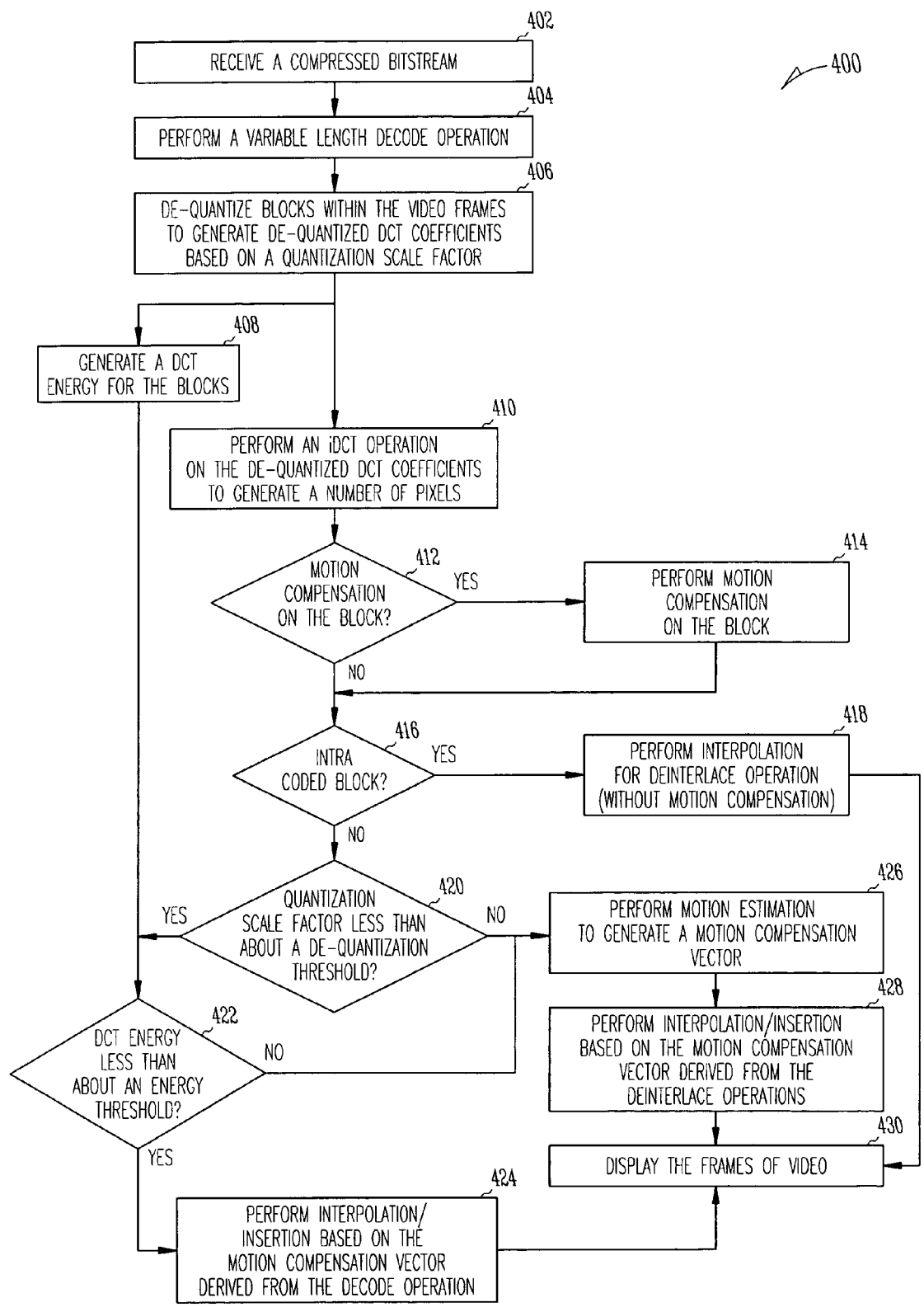
FIG. 4 illustrates a flow diagram of operations for shared decoding and deinterlacing, according to one embodiment of the invention.

An output of the motion estimation logic 228 is coupled to an input of the motion compensation-based interpolation logic 234. An output of the motion compensation-based interpolation logic 234 is coupled to an input of the progressive frame buffer 236. An output of the motion compensation-based interpolation logic 230 is coupled to an input of the progressive frame buffer 236. An output of the interpolation logic 232 is coupled to an input of the progressive frame buffer 236. As further described below, the motion compensation-based interpolation logic 234, the motion compensation-based interpolation logic 230 and the interpolation logic 232 receive X number of lines of a block in a video frame and output 2X number of lines based on interpolation/insertion (which may or may not be based on motion compensation vectors derived from the decode operations). For example, if the motion compensation-based interpolation logic 234, the compensation-based interpolation logic 230 and the interpolation logic 232 receive a 4×4 block, the output is an 8×4 block. An output of the progressive frame buffer 236 is coupled to the display 104. An embodiment of the operations of the decoder/deinterlacer 102 shown in FIG. 2 is illustrated in FIG. 4, which is described in more detail below. While illustrated in a same logic block, the components of the decoder/deinterlacer 102 may or may not be part of a same unit (e.g., integrated circuit). For example, the components of the decoder may be on a separate integrated circuit from the components of the deinterlacer. Accordingly, the decoder may communicate with the separate deinterlacer through a shared bus, communications port, etc.

Figure 3:
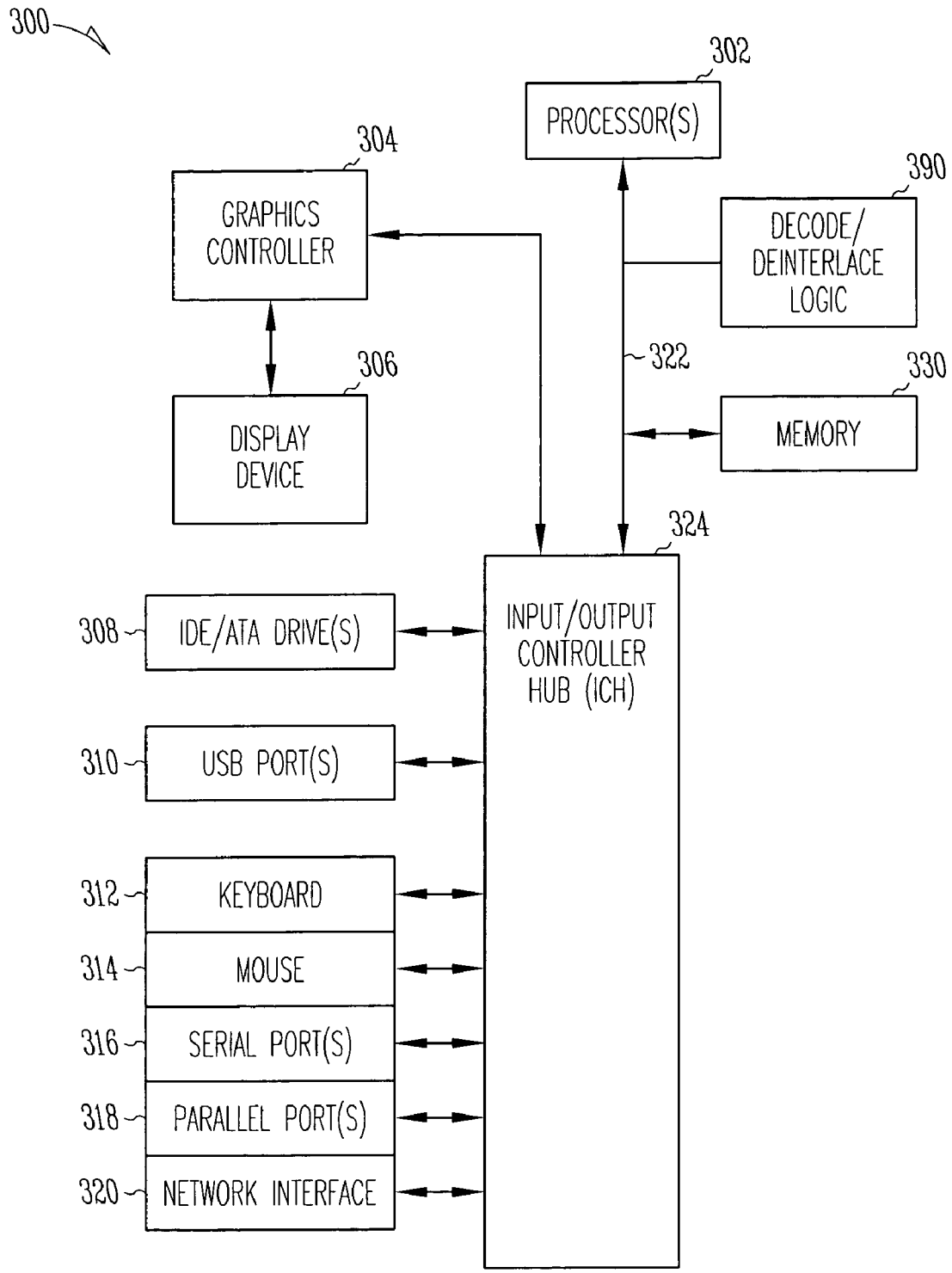
FIG. 3 illustrates a computer device that executes software for performing shared decode and deinterlace operations, according to one embodiment of the invention.

The embodiment of FIG. 2 illustrates different logic performing decode and deinterlace operations. Such logic may be hardware, software or a combination thereof. One embodiment wherein software performs the decode and deinterlace operations as described herein is now described. In particular, FIG. 3 illustrates a computer device that executes software for performing shared decode and deinterlace operations, according to one embodiment of the invention. As illustrated in FIG. 3, a computer device 300 comprises processor(s) 302, a decode/deinterlace logic 390. The computer device 300 also includes a memory 330, a processor bus 322, and an input/output controller hub (ICH) 324. The processor(s) 302, the memory 330, and the ICH 342 are coupled to the processor bus 322. The processor(s) 302 may comprise any suitable processor architecture. The computer device 300 may comprise one, two, three, or more processors, any of which may execute a set of instructions in accordance with embodiments of the invention.

The memory 330 stores data and/or instructions, and may comprise any suitable memory, such as a random access memory (RAM). For example, the memory 330 may be a Static RAM (SRAM), a Synchronous Dynamic RAM (SDRAM), DRAM, a double data rate (DDR) Synchronous Dynamic RAM (SDRAM), etc. A graphics controller 304 controls the display of information on a display device 306, according to an embodiment of the invention.

The ICH 324 provides an interface to Input/Output (I/O) devices or peripheral components for the computer system 300. The ICH 324 may comprise any suitable interface controller to provide for any suitable communication link to the processor(s) 302, the memory 330 and/or to any suitable device or component in communication with the ICH 324. For one embodiment of the invention, the ICH 324 provides suitable arbitration and buffering for each interface.

In one embodiment, the ICH 324 provides an interface to one or more suitable Integrated Drive Electronics (IDE)/Advanced Technology Attachment (ATA) drive(s) 308, such as a hard disk drive (HDD) or compact disc read only memory (CD ROM) drive, or to suitable universal serial bus (USB) devices through one or more USB ports 310. In an embodiment, the ICH 324 also provides an interface to a keyboard 312, a mouse 314, one or more suitable devices through one or more parallel ports 318 (e.g., a printer), and one or more suitable devices through one or more serial ports 316. In some embodiments, the ICH 324 also provides a network interface 320 though which the computer system 300 may communicate with other computers and/or devices.

The memory 330 and/or one of the IDE/ATA drives 308 may store buffers for the storage of pixels of frames of video. For example, the memory 330 and/or one of the IDE/ATA drives 308 may include a buffer that stores blocks of pixels for frames of video (similar to the buffers 206/209/212/220 in FIG. 2). Additionally, the memory 330 and/or one of the IDE/ATA drives 308 may include a buffer that stores the frames of video subsequent to a deinterlace operation (similar to the progressive frame buffer 236).

In one embodiment, the decode/deinterlace logic 390 may be instructions executing within the processor(s) 302. Therefore, the decode/deinterlace logic 390 may be stored in a machine-readable medium that are a set of instructions (e.g., software) embodying any one, or all, of the methodologies described herein. For example, the decode/deinterlace logic 390 may reside, completely or at least partially, within the memory 330, the processor(s) 302, one of the IDE/ATA drive(s) 308, etc. The frames of video that have been decoded and deinterlaced may be output to the display device 306 for display.

This section provides a description of shared decoding and deinterlacing operations, according to one embodiment of the invention. FIG. 4 illustrates a flow diagram of operations for shared decoding and deinterlacing, according to one embodiment of the invention. The operations of the flow diagram 400 are described with reference to the decoder/deinterlacer 102 shown in FIG. 2. However, such operations may be performed by the decode/deinterlace logic 390 shown in FIG. 3.

Blocks 402, 404, 406, 408, 410, 412 and 414 illustrate operations related to the decode operations. Blocks 416, 418, 420, 422, 424, 426 and 428 illustrate operations related to the deinterlace operations, which may or may not use the motion compensation vectors derived from the decode operations. The description of the blocks 416, 418, 420, 422, 424, 426 and 428 is described such that operations are performed on a block within frames of video. Accordingly, the operations described therein may be performed repeatedly for the decoded blocks received from the decode operations. Additionally, the decode operations and the deinterlace operations may be performed at least partially in parallel. For example, the deinterlace operations may commence after a block within a frame of video has been decoded. Accordingly, such operations may have low latency as decisions within the deinterlace operations may be made during the decode operations.

In block 402, a compressed bitstream is received. With reference to the embodiment of the decoder/deinterlacer 102 shown in FIG. 2, the variable length decoder 202 receives the compressed bitstream of fields of the video frames 106. In some embodiments, an encoder encodes fields (even or odd) of video frames to generate the compressed bitstream. Control continues at block 404.

In block 404, a variable length decode operation is performed. With reference to the embodiment of the decoder/deinterlacer 102 shown in FIG. 2, the variable length decoder 202 performs the variable length decode operation. The output from this variable length decode operation includes quantized transform coefficients. While the encoder may generate the quantized transform coefficients based on a number of different standards, in one embodiment, the encoder generates the transform coefficients based on a Discrete Cosine Transform. The output also includes motion compensation vectors and the associated motion compensation mode for the blocks of pixels in a frame of video that are non-intra coded and that are motion compensated based on a block in other frames in the video. The motion compensation mode provides the temporal direction of the frame that includes the block from which motion compensation is performed (e.g., the previous frame, the next frame, etc.). The motion compensation vector for a block provides the spatial direction of the block from which motion compensation is performed. The quantized transform coefficients, the motion compensation mode and the motion compensation vectors are inputted into the de-quantization logic 204.

Additionally, the motion compensation mode and the motion compensation vectors are stored in the motion compensation mode and motion compensation vectors buffer 212. As further described below, the motion compensation mode and the motion compensation vectors from the motion compensation mode and motion compensation vectors buffer 212 are inputted into the motion compensation-based interpolation logic 230 to allow for the use of the motion compensation vectors (generated by the decode operations) during the deinterlace operations. Control continues at block 406.

In block 406, blocks within the video frames are de-quantized to generate de-quantized transform coefficients based on a quantization scale factor. With reference to the embodiment of the decoder/deinterlacer 102 shown in FIG. 2, the de-quantization logic 204 de-quantizes the blocks within the video frames to generate de-quantized transform coefficients for the block based on a quantization scale factor. The quantization scale factor may be transmitted as part of the compressed bitstream and/or a value that is known between the encoder of the compressed bitstream and the decoder/deinterlacer 102. For example, the quantization scale factor may be part of a protocol between the encoder and the decoder/deinterlacer 102. As shown, the de-quantization logic 204 inputs the quantization scale factor into the quantization scale factor buffer 206. As is known, the quantization scale factor is representative of the amount of scaling that is performed as part of the de-quantization. As further described below, the quantization scale factor is used to determine whether a motion compensation vector from the decode operations may be used as part of the deinterlace operations. The de-quantization logic 204 outputs the de-quantized transform coefficients for the blocks of the video frames to the prediction error energy logic 208 and the inverse transform logic 210. Control continues at blocks 408 and 410.

In block 408, a prediction error energy for the block of a video frame is generated. With reference to the embodiment of the decoder/deinterlacer 102 shown in FIG. 2, the prediction error energy logic 208 generates the prediction error energy for the block of a video frame. While the prediction error energy may be generated a number of different ways, in an embodiment, the prediction error energy logic 208 may generate the prediction error energy by taking the sum of the squares of the de-quantized transform coefficients. The value of the prediction error energy is indicative of how well the block was encoded by the encoder. In particular, the lower the value of the prediction error energy, the better the encoding of the block. Accordingly, the more non-zero de-quantized transform coefficients the worse the encoding of the block may be. The prediction error energy logic 208 may store the value of the prediction error energy for this block into the prediction error energy buffer 209. Control continues at block 422, which is described in more detail below.

In block 410, an inverse transform operation is performed on the de-quantized transform coefficients to generate a number of pixels. With reference to the embodiment of the decoder/deinterlacer 102 shown in FIG. 2, the inverse transform logic 210 performs this inverse transform operation. Control continues at block 412.

In block 412, a determination is made of whether motion compensation is performed on blocks within the frames of video. With reference to the embodiment of the decoder/deinterlacer 102 shown in FIG. 2, the motion compensation logic 214 makes this determination. The motion compensation logic 214 receives the motion compensation mode and the motion compensation vectors for the different blocks within the video frame. The motion compensation logic 214 may make this determination based on whether a block includes a motion compensation mode and the motion compensation vector received from the variable length decoder 202. Some blocks (including the intra coded and a part of the non-intra coded blocks) are not motion compensated and do not have an associated motion compensation mode and the motion compensation vector. Some blocks (including a part of the non-intra coded blocks) are motion compensated and do include a motion compensation mode and the motion compensation vector. Upon determining that motion compensation is not performed on a block, control continues at block 416.

In block 414, upon determining that motion compensation is performed on a block, motion compensation is performed on the block. With reference to the embodiment of the decoder/deinterlacer 102 shown in FIG. 2, the motion compensation logic 214 receives the motion compensation mode and the motion compensation vector for the block from the variable length decoder 202 via the motion compensation mode and motion compensation vector buffer 212. As shown, the motion compensation logic 214 also receives the blocks from the previous frames 218. The motion compensation logic 214 determines which frame and which block in that frame from the previous frames 218 are used for motion compensation based on the motion compensation mode and the motion compensation vector 212 for the block, respectively. The motion compensation logic 214 inputs this block into the adder logic 216. The adder logic 216 adds the values of the pixels in this received block to the values of the corresponding pixels in the current block being processed, thereby performing motion compensation for this block. Additionally, whether or not motion compensation is performed for a block, the block is stored in the buffer 220. Accordingly, the buffer 220 stores the decoded blocks of frames of video. Control continues at block 416.

In block 416, a determination is made of whether a block of the frames of video is intra coded. With reference to the embodiment of the decoder/deinterlacer 102 shown in FIG. 2, the select logic 224 makes this determination. In particular, if the block is non-intra coded, the compressed bitstream 106 from the encoder includes such an indication, which may be extracted by the variable length decoder 202 and stored in the motion compensation mode and the motion compensation vector buffer 212. Accordingly, the select logic 224 receives this indication from the associated motion compensation mode and the motion compensation vector buffer 212 if the block is non-intra coded. Upon determining that the block is non-intra coded, control continues at block 420, which is described in more detail below.

In block 418, upon determining that the block is intra coded, interpolation is performed for the deinterlace operation. With reference to the embodiment of the decoder/deinterlacer 102 shown in FIG. 2, the select logic 224 controls the multiplexer 226 to cause the output (the block from the buffer 220) of the multiplexer 226 to be inputted into the interpolation logic 232. The interpolation logic 232 may perform the interpolation. In some embodiments, the interpolation logic 232 may perform a 2:1 vertical interpolation to deinterlace the block. The interpolation logic 232 may repeat a line above or below the line being interpolated. The interpolation logic 232 may generate an interpolated line based on average pixel values between the pixel above and the pixel below. The interpolation logic 232 stores the deinterlaced block into the progressive frame buffer 236. Control continues at block 430, which is described in more detail below.

In block 420, a determination is made of whether the quantization scale factor (for the block being deinterlaced) is less than a de-quantization threshold. With reference to the embodiment of the decoder/deinterlacer 102 shown in FIG. 2, the select logic 224 makes this determination. In particular, the select logic 224 has determined that the block is non-intra coded (as described above). The select logic 224 performs a first part of a determination of whether the motion compensation vector is acceptable for use in the deinterlace operations.

Accordingly, the select logic 224 receives the quantization scale factor (for this block) from the quantization scale factor buffer 206. The select logic 224 determines if this quantization scale factor is less than a de-quantization threshold. The quantization scale factor may be a value having a range between 1 and 112. The de-quantization threshold may be dynamic (programmable) and may vary depending on the hardware/software on which these operations are being executed, the type of video, etc. For example, the de-quantization threshold may be higher if the video being decoded is not required to be of "high" quality. The de-quantization threshold may be higher if the encoder that encoded the compressed bitstream has been tested to provide "good" motion compensation vectors. Upon determining that the quantization scale factor (for the block being deinterlaced) is not less than a de-quantization threshold, control continues at block 426, which is described in more detail below.

In block 422, upon determining that the quantization scale factor (for the block being deinterlaced) is less than a de-quantization threshold, a determination is made of whether the prediction error energy (for the block being deinterlaced) is less than an energy threshold. With reference to the embodiment of the decoder/deinterlacer 102 shown in FIG. 2, the select logic 224 makes this determination. In particular, the select logic 224 performs a second part of a determination of whether the motion compensation vector is acceptable for use in the deinterlace operations. The select logic 224 receives the prediction error energy (for the block being deinterlaced) from the prediction error energy buffer 209. The select logic 224 compares this prediction error energy to an energy threshold. Similar to the de-quantization threshold, the energy threshold may be dynamic (programmable) and may vary depending on the hardware/software on which these operations are being executed, the type of video, etc. Upon determining that the prediction error energy (for the block being deinterlaced) is not less than an energy threshold, control continues at block 426 (where the deinterlace operations are not to use the motion compensation vector for the block from the decode operation). Such operations are described in more detail below.

In block 424, upon determining that the prediction error energy (for the block being deinterlaced) is less than an energy threshold, an interpolation and/or an insertion is performed based on the motion compensation vector derived from the decode operation. With reference to the embodiment of the decoder/deinterlacer 102 shown in FIG. 2, the motion compensation-based interpolation logic 230 performs this interpolation/insertion. In particular, in some embodiments, upon determining that the quantization scale factor is less than a de-quantization threshold and that the prediction error energy is less than an energy threshold, the select logic 224 controls the multiplexer 226 to cause the output (the block from the buffer 220) of the multiplexer 226 to be inputted into the motion-compensation-based interpolation logic 230. The motion compensation-based interpolation logic 230 performs this interpolation/insertion based on the motion compensation vector derived from the decode operation. In some embodiments, the motion compensation-based interpolation logic 230 performs the deinterlace operation based on a simple field insertion of the pixels from the corresponding field from the motion compensation predictor block.

In some embodiments, the motion compensation-based interpolation logic 230 interpolates a field of the block of pixels with spatio-temporal field interpolation with the motion compensation predictor block. The motion compensation-based interpolation logic 230 may perform the deinterlace operation based on a number of different types of vertical temporal filtering. For example, the motion compensation-based interpolation logic 230 may perform the deinterlace operation based an interpolation wherein average values for the pixels in the line being generated are used. For example, the motion compensation-based interpolation logic 230 may generate pixels for an interpolated line based on the pixels from the corresponding field from the motion compensation predictor block and the pixels above and/or below. The motion compensation-based interpolation logic 230 stores the deinterlaced block into the progressive frame buffer 236. Control continues at block 430, which is described in more detail below.

In block 426, a motion estimation is performed to generate a motion compensation vector for the block. With reference to the embodiment of the decoder/deinterlacer 102 shown in FIG. 2, the motion estimation logic 228 performs this motion estimation. In one embodiment, the motion estimation logic 228 performs motion estimation around the block. In some embodiments, the motion estimation logic 228 performs motion estimation based on a +/−16 Horizontal, Vertical ¼ pel field motion estimation. In some embodiments, the motion estimation logic 228 performs motion estimation using the motion compensation vector derived from the decode operation as the initial candidate for the search for a different block to be used for motion estimation. Control continues at block 428.

In block 428, an interpolation and/or an insertion is performed based on the motion compensation vector derived from the deinterlace operations. With reference to the embodiment of the decoder/deinterlacer 102 shown in FIG. 2, the motion compensation-based interpolation logic 234 performs this interpolation/insertion based on the motion compensation vector derived from the deinterlace operations. Accordingly, a new motion compensation vector may be generated if the motion compensation vector derived from the decode operations is not defined as "acceptable" based on the quantization scale factor and the prediction error energy for the block.

In some embodiments, the motion compensation-based interpolation logic 234 performs the deinterlace operation based on a simple field insertion of the pixels from the corresponding field from the motion compensation predictor block. In some embodiments, the motion compensation-based interpolation logic 234 interpolates a field of the block of pixels with spatio-temporal field interpolation with the motion compensation predictor block. The motion compensation-based interpolation logic 234 may perform the deinterlace operation based on a number of different types of vertical temporal filtering. For example, the motion compensation-based interpolation logic 234 may perform the deinterlace operation based an interpolation wherein average values for the pixels in the line being generated are used. For example, the motion compensation-based interpolation logic 234 may generate pixels for an interpolated line based on the pixels from the corresponding field from the motion compensation predictor block and the pixels above and/or below. The motion compensation-based interpolation logic 234 stores the deinterlaced block into the progressive frame buffer 236. Control continues at block 430.

In block 430, the frames of video that include the deinterlaced blocks are displayed. With reference to the embodiment shown in FIG. 1, the display 104 displays the frames of video.

As described, the operations within the blocks 416, 418, 420, 422, 424, 426 and 428 may be performed on a block-by-block basis. Accordingly, a deinterlace operation for a block is independent of deinterlace operations for other blocks (within a same or different video frame). Therefore, a first block may be intra coded (wherein a motion compensation vector is not used) and thus be processed by the interpolation logic 232; a second block may be non-intra coded (wherein the motion compensation vector from the decode operation is used) and thus be processed by the motion compensation-based interpolation logic 230; and a third block may be non-intra coded (wherein the motion compensation vector from the decode operation is not used) and thus be processed by the motion compensation-based interpolation logic 234.

While the operations of the flow diagram 400 are described such that the quantization scale factor and the prediction error energy for a block is analyzed prior to the use of a motion compensation vector (from the decode operation) in the deinterlace operations, embodiments of the invention are not limited. In some embodiments, the quantization scale factor or the prediction error energy for a block is analyzed prior to the use of a motion compensation vector (from the decode operation) in the deinterlace operations. In some embodiments, the motion compensation vector (from the decode operation) may be used in the deinterlace operation without an analysis of how "good" the motion compensation vector is. Moreover, while illustrated such that the prediction error energy is based on the quantized transform coefficients, embodiments of the invention are not so limited. For example, in some embodiments, the prediction error may be based on the pixels in a block output from the inverse transform logic 210. Accordingly, the prediction error energy logic 208 may be coupled to receive the output from the inverse transform logic 210.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), etc.

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for shared logic for decoding and deinterlacing of compressed video, in accordance with embodiments of the invention. A number of figures show flow diagrams illustrating shared operations for decoding and deinterlacing of compressed video. The operations of the flow diagrams will be described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagram.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method comprising:
receiving a compressed video stream at a variable length decoder of a decoder/deinterlacer;
decoding a number of blocks of the compressed video stream to output a number of blocks of decoded video data using motion compensation-based interpolation logic associated with the decoder/deinterlacer, wherein the decoding is based on at least one motion compensation vector included in the compressed video stream;
generating a prediction error energy for at least one of the number of blocks;
upon determining that the prediction error energy exceeds an energy threshold or upon determining that a quantization scale factor exceeds a dequantization threshold, generating an updated motion compensation vector; and
deinterlacing at least some of the number of blocks of the decoded video data to output deinterlaced video data using the motion compensation-based interpolation logic, wherein the deinterlacing of the at least one of the blocks of the number of blocks is based on the at least one motion compensation vector included in the compressed video stream if the prediction error energy for the at least one motion compensation vector is less than the energy threshold and the quantization scale factor is less than the dequantization threshold, and wherein the deinterlacing of the at least one of the number of blocks is based on the updated motion compensation vector if the prediction error energy exceeds the energy threshold or the quantization scale factor exceeds the dequantization threshold.

2. A method comprising:
deinterlacing a block of a frame of video based on a vertical interpolation, if the block of the frame of the video is intra coded using interpolation logic of a decoder/deinterlacer;
deinterlacing the block of the frame of the video with a motion compensation vector that is derived from decoding the block of the frame of the video using the interpolation logic if the block of the frame of the video is not intra coded and if a de-quantization scale factor is less than a scale factor threshold and if a prediction error energy of the block is less than an energy threshold, wherein the energy threshold varies according to a type of video associated with the block; and
performing motion estimation on the block of the video using motion estimation logic of the decoder/deinterlacer to generate an updated motion compensation vector if the block of the frame of the video is not intra coded and if the de-quantization scale factor is greater than the scale factor and if the prediction error energy of the block is greater than the energy threshold; and
deinterlacing the block of the frame of the video with the updated motion compensation vector using motion compensation-based interpretation logic of the decoder/deinterlacer if the block of the frame of the video is not intra coded and if the de-quantization scale factor is greater than the scale factor and if the prediction error energy of the block is greater than the energy threshold.

3. The method of claim 2, wherein performing motion estimation on the block of the video to generate the updated motion compensation vector comprises performing motion estimation on the block of the video to generate the updated motion vector using the motion compensation vector as an initial candidate motion vector.

4. The method of claim 2, further comprising decoding the frame of the video using a variable length decoder.

5. The method of claim 4, wherein decoding the frame of the video comprises:
dequantizing a compressed bitstream that includes the frame of the video to generate a number of transform coefficients based on the de-quantizing scale factor using de-quantization logic of the decoder/deinterlacer; and
performing an inverse transform operation on the number of transform coefficients using inverse transform logic of the decoder/deinterlacer to generate a number of pixels representative of the frame of the video.

6. The method of claim 5, wherein decoding the frame of the video further comprises performing motion compensation for a block in the frame of the video using the motion estimation logic if the block is not intra coded and has been encoded using motion compensation.

7. The method of claim 2, further comprising generating the prediction error energy of the block using prediction error energy logic of the decoder/deinterlacer.

8. The method of claim 7, wherein generating the prediction error energy of the block comprises:
squaring the values of the transform coefficients in the block to generate squared values; and
summing the squared values to generate the prediction error energy for the block.

9. A non-transitory machine-readable medium having stored thereon instructions, which when executed by a machine, cause said machine to perform operations comprising:
- decoding a compressed video stream to output a decoded video stream, wherein the decoding extracts at least one decode parameter, wherein the decoding comprises performing a de-quantization based on a de-quantization scale factor, wherein an output of the de-quantization has a prediction error energy; and
- deinterlacing the decoded video stream to output a deinterlaced video stream, using the at least one decode parameter extracted by the decoding, if the prediction error energy is less than an energy threshold or if the de-quantization scale factor is less than a de-quantization threshold, wherein the de-quantization threshold varies based on a type of the compressed video stream.

10. The non-transitory machine-readable medium of claim 9, wherein the at least one decode parameter comprises a motion estimation vector.

11. The non-transitory machine-readable medium of claim 9, wherein the operations further comprise generating the prediction error energy of the block.

12. The non-transitory machine-readable medium of claim 11, wherein generating the prediction error energy of the block comprises:
- squaring the values of a number of transform coefficients in the block to generate squared values; and
- summing the squared values to generate the prediction error energy for the block.

13. A non-transitory machine-readable medium having stored thereon instructions, which when executed by a machine, cause said machine to perform operations comprising:
- decoding a number of blocks of a compressed video stream to output a number of blocks of decoded video data, wherein the decoding is based on at least one motion compensation vector included in the compressed video stream;
- generating a prediction error energy for at least one of the number of blocks;
- upon determining that the prediction error energy exceeds an energy threshold or upon determining that a quantization scale factor exceeds a dequantization threshold, generating an updated motion compensation vector; and
- deinterlacing the number of blocks of the decoded video data to output deinterlaced video data, wherein the deinterlacing of the at least one of the blocks of the number of blocks is based on the at least one motion compensation vector included in the compressed video stream if the prediction error energy for the block is less than the energy threshold and the quantization scale factor is less than the dequantization threshold, and wherein the deinterlacing of the at least one of the number of blocks is based on the updated motion compensation vector if the prediction error energy exceeds the energy threshold or the quantization scale factor exceeds the dequantization threshold.

14. A system comprising:
- a deinterlacer to deinterlace a block of a frame of video with a motion compensation vector that is derived from a decode operation performed on the frame of the video if a prediction error energy for the block is less than an energy threshold, wherein the energy threshold varies based on a type of video associated with the block;
- a random access memory to store the deinterlaced frame of the video; and
- a display to display the deinterlaced frame of the video.

15. The system of claim 14, wherein the display is a progressive screen display.

16. The system of claim 14, wherein the deinterlacer is to deinterlace the block of the frame of video with the motion compensation vector that is derived from the decode operation of the frame of the video if a de-quantization scale factor for the block is less than a de-quantization threshold.

17. The system of claim 14, wherein the prediction error energy comprises a Discrete Cosine Transform energy for the block.

18. The method of claim 1, wherein the de-quantization threshold varies based on a type of video associated with the block.

* * * * *

UNITED STATES PATENT AND TRADEMARK OFFICE
CERTIFICATE OF CORRECTION

| | | Page 1 of 1 |
|---|---|---|
| PATENT NO. | : 7,965,770 B2 | |
| APPLICATION NO. | : 10/815172 | |
| DATED | : June 21, 2011 | |
| INVENTOR(S) | : Raju Hormis et al. | |

It is certified that error appears in the above-identified patent and that said Letters Patent is hereby corrected as shown below:

In the Claims

In column 11, line 52, in Claim 1, delete "determining" and insert -- determining by the decoder/deinterlacer --, therefor.

In column 11, line 55, in Claim 1, delete "generating" and insert -- generating by the decoder/deinterlacer --, therefor.

Signed and Sealed this
Twenty-ninth Day of April, 2014

Michelle K. Lee
*Deputy Director of the United States Patent and Trademark Office*